US006158792A

United States Patent [19]
Snider

[11] Patent Number: 6,158,792
[45] Date of Patent: Dec. 12, 2000

[54] MAGNETIC SWEEPER DEVICE WITH STRUCTURALLY INTEGRATING BRACKET

[75] Inventor: Greg S. Snider, Medina, Ohio

[73] Assignee: Sulo Enterprises, Inc.

[21] Appl. No.: 09/188,012

[22] Filed: Nov. 6, 1998

[51] Int. Cl.[7] ................................ B03C 1/00; B25J 15/06
[52] U.S. Cl. ........................................... 294/65.5; 209/215
[58] Field of Search ............................ 294/65.5; 15/41.1, 15/105, 160; 209/215–217; 335/285, 291, 293, 296

[56] References Cited

U.S. PATENT DOCUMENTS

| | | | |
|---|---|---|---|
| 2,654,480 | 10/1953 | Stem | 294/65.5 X |
| 3,014,586 | 12/1961 | Ross | 294/65.5 X |
| 3,343,675 | 9/1967 | Budd | 294/65.5 X |
| 3,646,492 | 2/1972 | Westermann | 294/65.5 X |
| 4,407,038 | 10/1983 | Haase | 294/65.5 X |
| 5,285,904 | 2/1994 | Haase | 209/215 |
| 5,624,146 | 4/1997 | De Los Reyes et al. | 294/65.5 |

FOREIGN PATENT DOCUMENTS

| | | | |
|---|---|---|---|
| 2367474 | 6/1978 | France | 209/215 |

*Primary Examiner*—Johnny D. Cherry
*Attorney, Agent, or Firm*—Arter & Hadden LLP

[57] ABSTRACT

A magnetic sweeper device is constructed with a structural integrating bracket which provides structural interconnection between one or more magnets, conveyance devices such as wheels, and a manipulation device such as a handle. The bracket includes a main section against which one or more magnets are attached by through-fit fasteners, conveyance attachment structures at distal ends for attachment of wheels, and a centrally disposed stem for attachment of a handle. The bracket also functions to direct the magnetic field downward by attachment of the magnet to a lower underside surface of the main section of the bracket. A magnet cover can also be attached to the magnet by the magnet supporting fasteners attached to the bracket.

7 Claims, 2 Drawing Sheets

MAGNETIC SWEEPER DEVICE WITH STRUCTURALLY INTEGRATING BRACKET

FIELD OF THE INVENTION

The present invention pertains generally to tools and magnetic devices and, more particularly, to tools in which magnets are operatively mounted.

BACKGROUND OF THE INVENTION

Magnetic sweeping and catching devices, for attracting ferrous or other magnetic objects, have one or more magnets mounted upon a holder or handle. As the magnets in such devices or tools are relatively massive, they must be adequately secured to the surrounding structure. Fasteners cannot be directly anchored in the magnet(s), so that the use of surrounding plates or supports is required. The structure which surrounds and supports the magnet or magnets must then be connected to a gripping assembly such as a handle. The separate mounting of magnets and attachment of this assembly to an adjoining structure complicates the manufacture and assembly of such devices, thereby adding to the cost.

SUMMARY OF THE INVENTION

The present invention provides a magnetic sweeper device which has an integrated mounting bracket which supports one or more magnets, and includes appendages which directly interface with the handle and wheel components of the sweeper device. In accordance with one object of the invention, there is provided a magnetic sweeper device having a bracket adapted to be attached to at least one magnet, the bracket further including one or more appendages adapted to be attached to a conveyance device such as a wheel, and at least one appendage adapted for attachment to a gripping device such as handle for manipulation of the magnetic sweeper device.

In accordance with another aspect of the invention, there is provided a bracket for use in connection with a magnetic sweeper device, the bracket having a main section adapted for attachment to one or more magnets, two wheel mounting axles extending from opposite ends of the main section, a handle mounting shaft extending from the main section between the wheel mounting axles, and apertures in the main section adapted to receive fasteners for attachment of one or more magnets to the main section.

These and other aspects of the invention are herein described in particularized detail with reference to the accompanying Figures.

DETAILED DESCRIPTION OF THE INVENTION

With reference to the Figures, there is shown a magnetic sweeper device, indicated generally at 10, which in this particular embodiment includes a magnet 12, which may be a single magnet or multiple magnets made of any type of magnetic material suitable for attracting ferrous or other magnetic objects, held within a bracket 20 which is longitudinally centered about a handle 14, and flanked at longitudinal ends by wheels 16. This type of mounting of the magnet 12 in bracket 20 and in combination with the handle 14 and wheels 16 allows the magnet to be easily conveyed over a surface to attract and pick-up ferrous or other magnetic objects.

Figure 2:
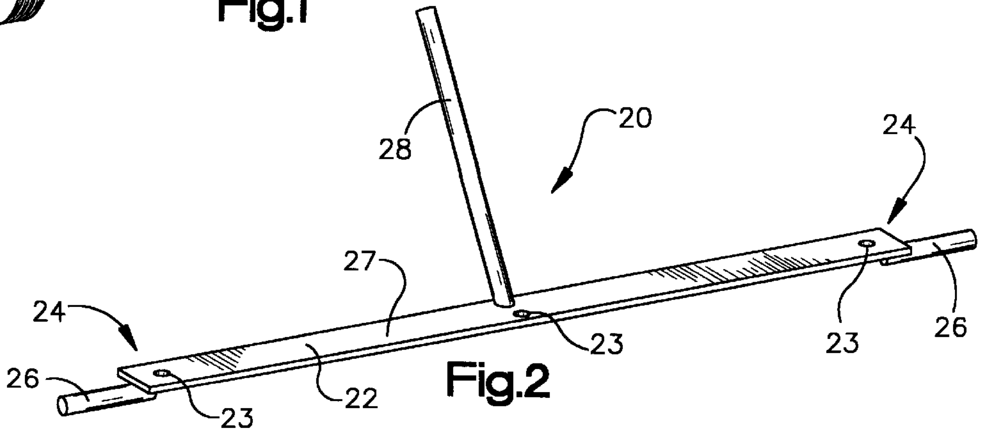
FIG. 2 is a perspective view of a bracket of the present invention adapted for use in connection with a magnetic sweeper device.

FIG. 2 illustrates a bracket 20 which is configured to integrate the combined structure of the sweeper device 10. The bracket 20 includes a main section 22, which in this particular embodiment is a generally planar, elongate, rectangular piece, with a length dimension at least equal to a length of a magnet or magnets to be attached to the section 22, and a width dimension which is at least equal to a width of a magnet or magnets to be attached to the section 22. From distal ends 24 of the main section 22 extend wheel attachment structures 26 in the form of generally rod-like extensions which serve as axle mounts for wheels 16. Although shown in this form, it is within the scope of the invention to have other types of attachment structures extend from the main section 22 which are attachable to different types of conveyances other than wheels.

Figure 3:
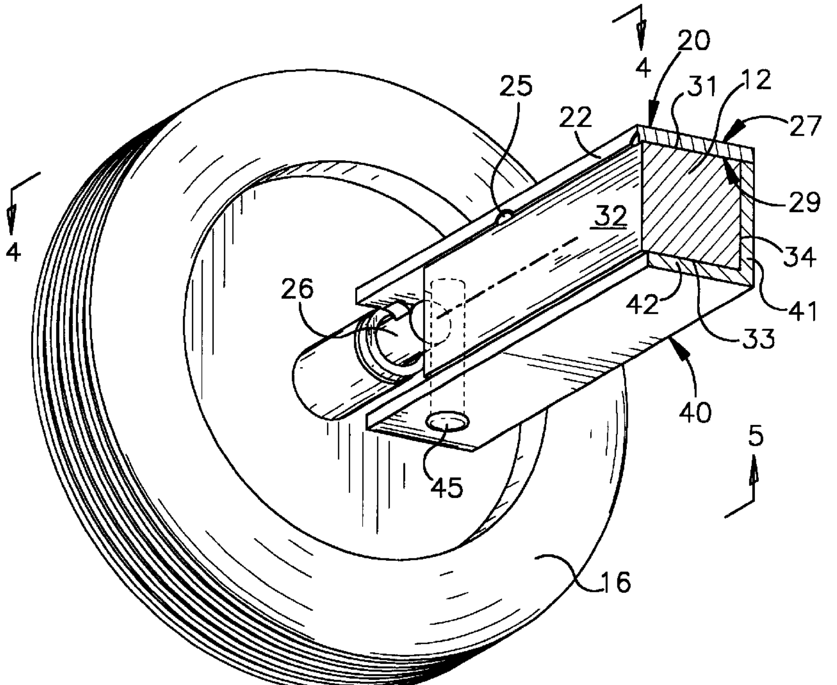
FIG. 3 is a perspective view of one area of the magnetic sweeper device of FIG. 1.
Figure 1:
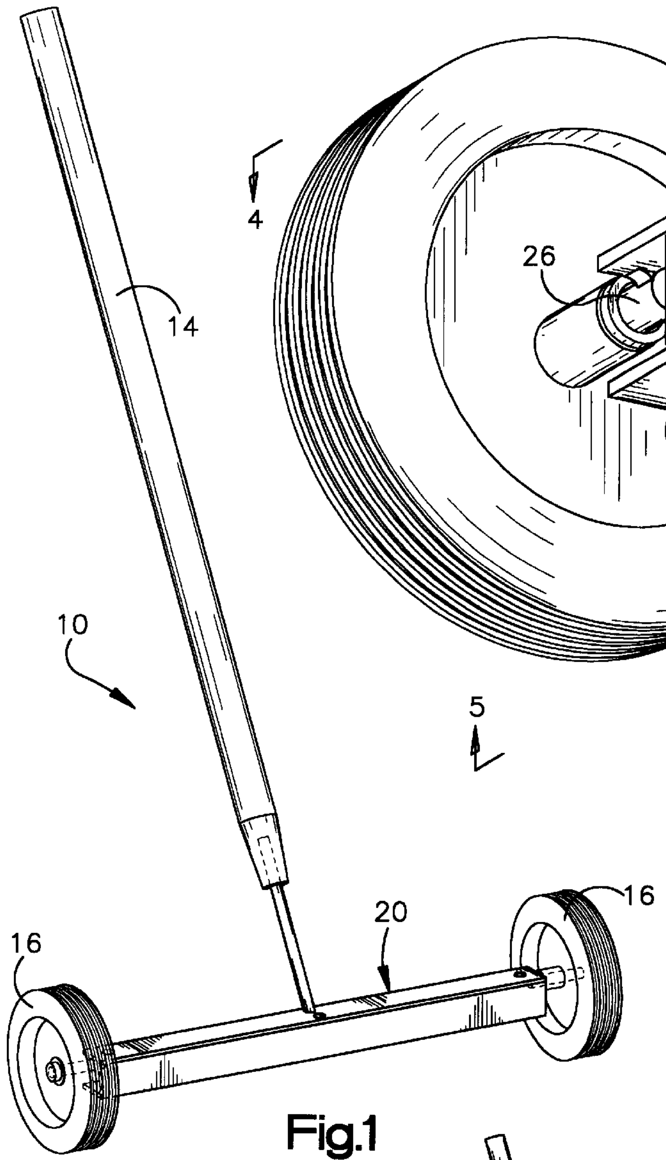
FIG. 1 is a perspective view of a magnetic sweeper device constructed in accordance with the present invention.

The main section 22 further includes a stem 28 which is secured to and extends generally out of the plane of the main section 22, and is adapted for attachment to handle 14 or other structure operative for manipulation of the sweeper or connection to another structure or assembly. The stem 28 may be welded or secured by fastener or other means to the main section 22. In a preferred embodiment, the stem 28 is welded to an upper surface 27 of main section 22 so that an opposite lower surface 29 remains uninterrupted for flush arrangement against magnet 12. The main section 22 thereby also functions to direct the magnetic field of magnet 12 downward or away from the main section 22, to an area in which magnetic objects are to be attracted by the device. As best shown in FIG. 3, the lower surface 29 of the main section 22 includes one or more stakes 25 which are formed to protrude from the lower surface 29 for engagement with magnet 12, to further secure the magnet within the holding structure further described below.

As best shown in FIG. 3, a magnet or magnets 12 has an upper surface 31 which is generally planar and which is placed substantially flush against the lower surface 29 of the main section 22. The magnet 12 is in this embodiment a generally elongate bar having a square or rectangular cross-section including rear surface 32, bottom surface 33, frontal surface 34 and upper surface 31. Of course magnets 12 of different configurations which are nonetheless attachable to the main section are also within the scope of the invention.

A magnet cover 40, such as an anodized aluminum angle, having a generally vertical web 41 and horizontal web 42, is provided to extend substantially the entire length of the main section 22, and configured to fit flush against the magnet 12, for example, against surfaces 34 and 33, to thereby form in combination with the lower surface 29 of the main section 22 a housing or enclosure for magnet 12. The main section 22 further includes a plurality of holes 23 which are aligned with corresponding holes in the horizontal web 42 of the magnet cover 40, for installation of fasteners 45 which secure the described assembly together and effectively encapsulate the magnet 12. In this particular embodiment, the laterally positioned fasteners 45 are positioned at the distal ends of magnet 12 and do not intersect the magnet, and the centrally disposed fastener 45 bisects the magnet 12 which is actually in two pieces. The fasteners 45 are preferably non-ferrous/non-magnetic. The magnet cover may be fabricated of aluminum or plastic or other suitable non-ferrous material, so as to avoid shorting out of the magnet or other interruption of the downwardly directed magnetic field.

Figure 4:
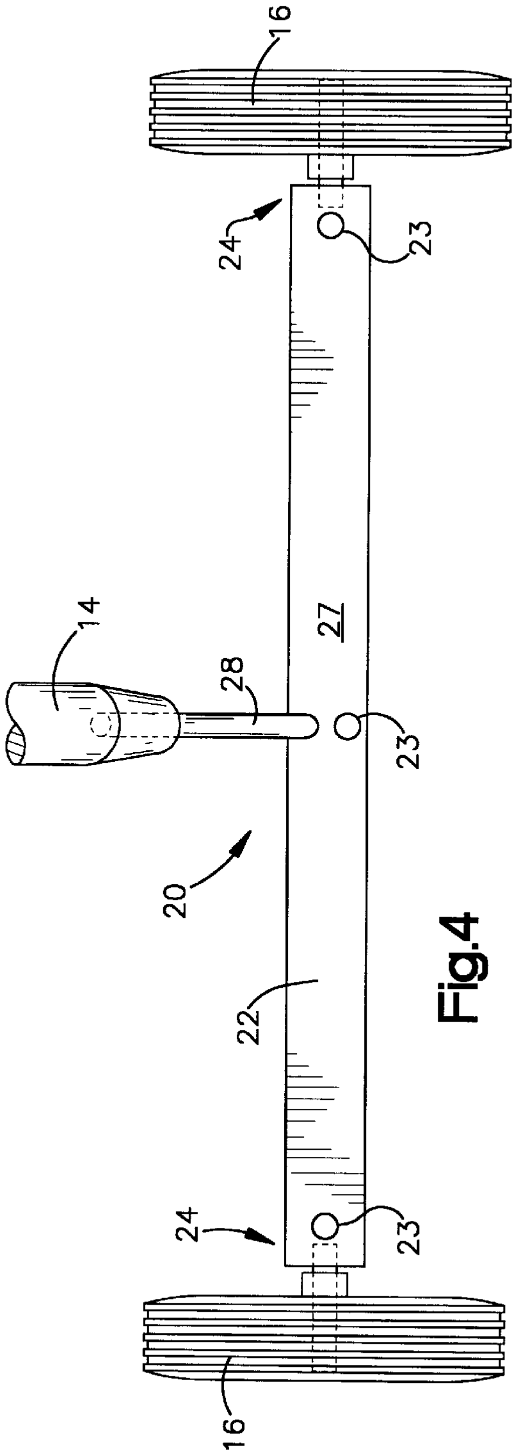
FIG. 4 is a partial top view of the magnetic sweeper device of FIG. 1.
Figure 5:
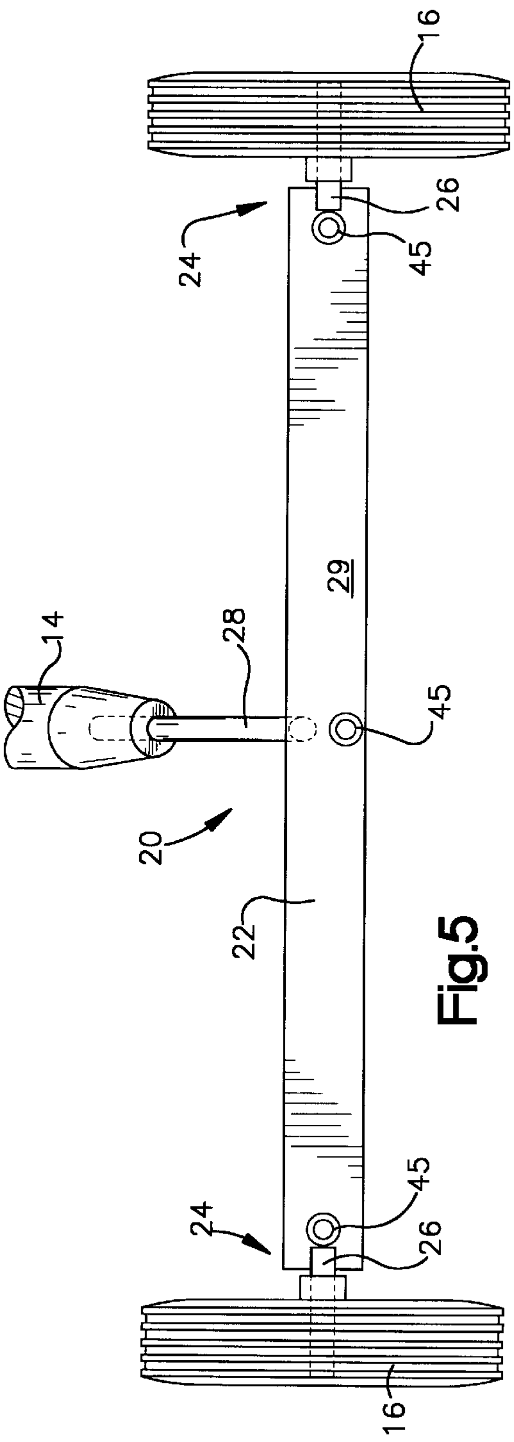
FIG. 5 is a partial bottom view of the magnetic sweeper device of FIG. 1.

As shown in FIGS. 4 and 5, the holes 23 located proximate to the distal ends 24 of the main section 22 are positioned slightly inboard of the wheel attachment structures 26. The stem 28 is located in a laterally offset position upon upper surface 27 of main section 22 to provide for a hole 23 to be centrally longitudinally disposed in the main section for structurally sound attachment of the magnet 12 and magnet cover 40 to the bracket 20. The fasteners 45 may be rivets, bolts, screws, adhesive devices or any other suitable means for interconnection of the described components. The fasteners 45, in combination with stakes 25 in the lower surface 29 of the main section 22 securely integrate the combined structure and insure that the magnet 12 will remain in the proper position with the magnetic field correctly oriented.

The described invention thus provides a magnetic sweeper device and integrated bracket which provides a sound integrated structure which is economical to produce. The bracket 20 performs the specific functions of providing a mounting structure for wheels 16; providing a mounting structure for the magnet 12 and magnet cover 40 and fasteners 45, staking the magnet 12 securely within the enclosure formed by the main section 22 and the magnet cover 40, and providing a stem for attachment of a handle or other manipulating connection.

Although the invention has been shown and described with reference to a particular embodiment, variations and modification on the basic principles of the invention are nonetheless within the scope of the invention as defined by the accompanying claims and equivalents thereof.

The invention claimed is:

1. A magnetic sweeper device comprising:

a single piece bracket for integral attachment of a magnet, at least one conveyance device, and a handle, the bracket having a main section with an upper surface and a lower surface, a magnet positioned adjacent to a lower surface of the bracket between distal ends of the bracket, at least one conveyance device attached to a convevance attachment structure on a distal end of the bracket, a handle attached to a stem which extends from the main section between the distal ends, a magnet cover attached to the bracket and positioned closely adjacent to the magnet, and at least one stake in an edge of the bracket which extends between the lower surface of the bracket and the magnet, whereby the magnet is held adjacent to the bracket and the cover.

2. A bracket for integrated assembly of a magnetic sweeper device, the bracket comprising:

a generally planar main section having an upper surface and an opposite lower surface, the lower surface dimensioned to cover a side of a magnet positioned against the lower surface, one or more stakes which extend from an edge of the bracket below the lower surface to prevent a magnet positioned against the lower surface from sliding past the edge of the bracket, a conveyance attachment structure extending from each distal end of the main section, a handle attachment stem extending from the main section between the distal ends of the main section, and fastener attachment points in the main section for attachment of a magnet cover to the main section, the magnet cover and main section forming an enclosure for a magnet positioned against the lower surface of the main section, and the magnet being held in the enclosure by the stakes in the edge of the main section.

3. The bracket of claim 2 wherein the main section is generally rectangular, with a length dimension between the distal ends greater than a width dimension, and wherein the stakes are located along one edge of the length of the main section, and the stem is located at the center of the length dimension.

4. The bracket of claim 2 wherein the conveyance attachment structures are generally cylindrical rods which extend from the lower surface of the main section at the distal ends and are in general alignment with a longitudinal axis of the main section.

5. The bracket of claim 2 having at least one fastener opening in the main section located proximate to each distal end of the main section.

6. The bracket of claim 2 in combination with at least one magnet and a magnet cover secured to the bracket by at least one fastener, a conveyance device attached to each conveyance attachment structure, and a handle attached to the stem.

7. A magnetic sweeper device having an integral one piece bracket which structurally interconnects at least one magnet to one or more conveyance devices and to a handle for manipulating the sweeper, the bracket having a generally elongate rectangular main section having a length dimension greater than a width dimension, the length dimension being greater than a length of a magnet positioned against the main section, the main section having an upper surface and a lower surface, conveyance attachment structures in the form of generally cylindrical rods extending from distal ends of the main section, a handle attachment structure attached to the main section between the distal ends and extending from the upper surface, at least one magnet having a generally square cross-section with one side positioned against the lower surface of the main section, a non-ferrous magnet cover attached to the main section, the magnet cover having an L-shaped cross section formed by two webs joined at a right angle, an edge of a first web abutting against the lower surface of the main section and the first web positioned against a side of the magnet adjacent and perpendicular to the lower surface of the main section, and a second web flush against a side of the magnet opposite the side of the magnet against the lower surface of the main section, the magnet cover attached to the main section by fasteners which extend from the web opposite the main section to the main section and which bypass the magnet, whereby a flux field of the magnet is directed away from the main section through the non-ferrous magnet cover.

* * * * *